W. W. HOPKINS.
CALCULATING MACHINE.
APPLICATION FILED OCT. 21, 1908.
1,085,912.
Patented Feb. 3, 1914.
6 SHEETS—SHEET 2.
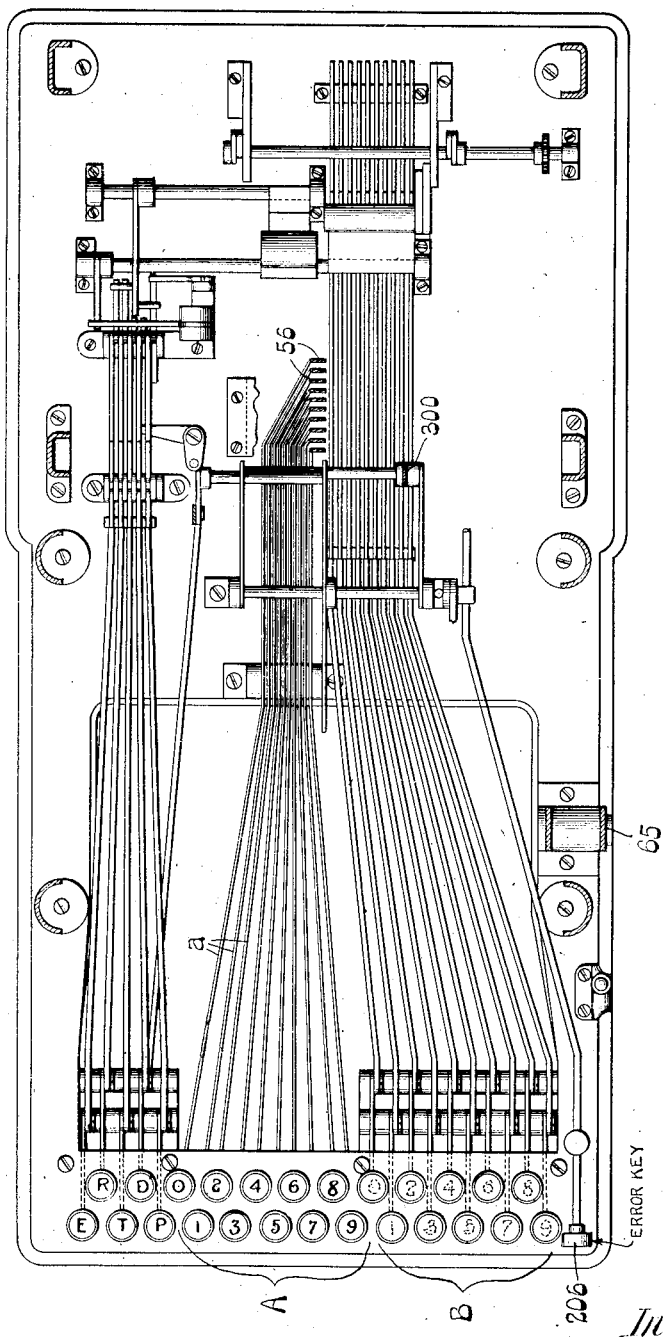

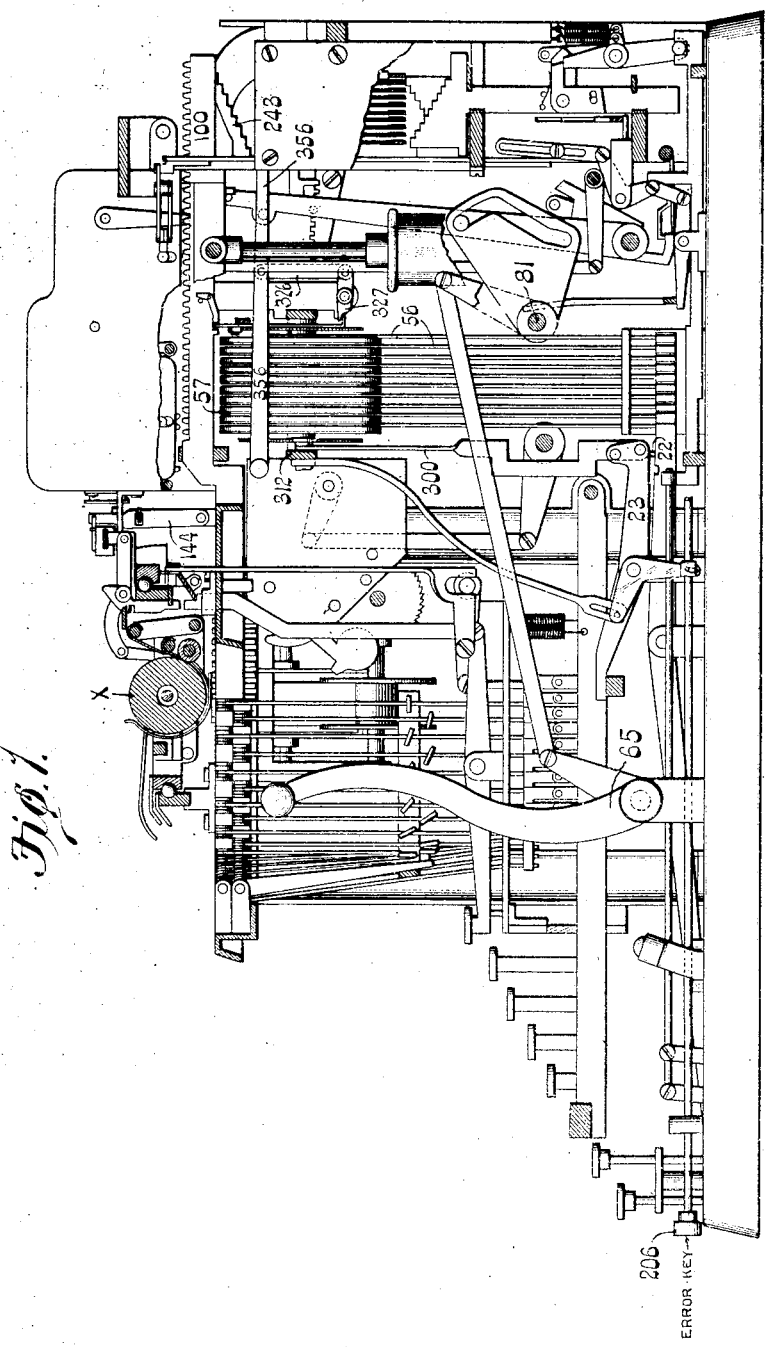

W. W. HOPKINS.
CALCULATING MACHINE.
APPLICATION FILED OCT. 21, 1908.
1,085,912.
Patented Feb. 3, 1914.
6 SHEETS—SHEET 3.
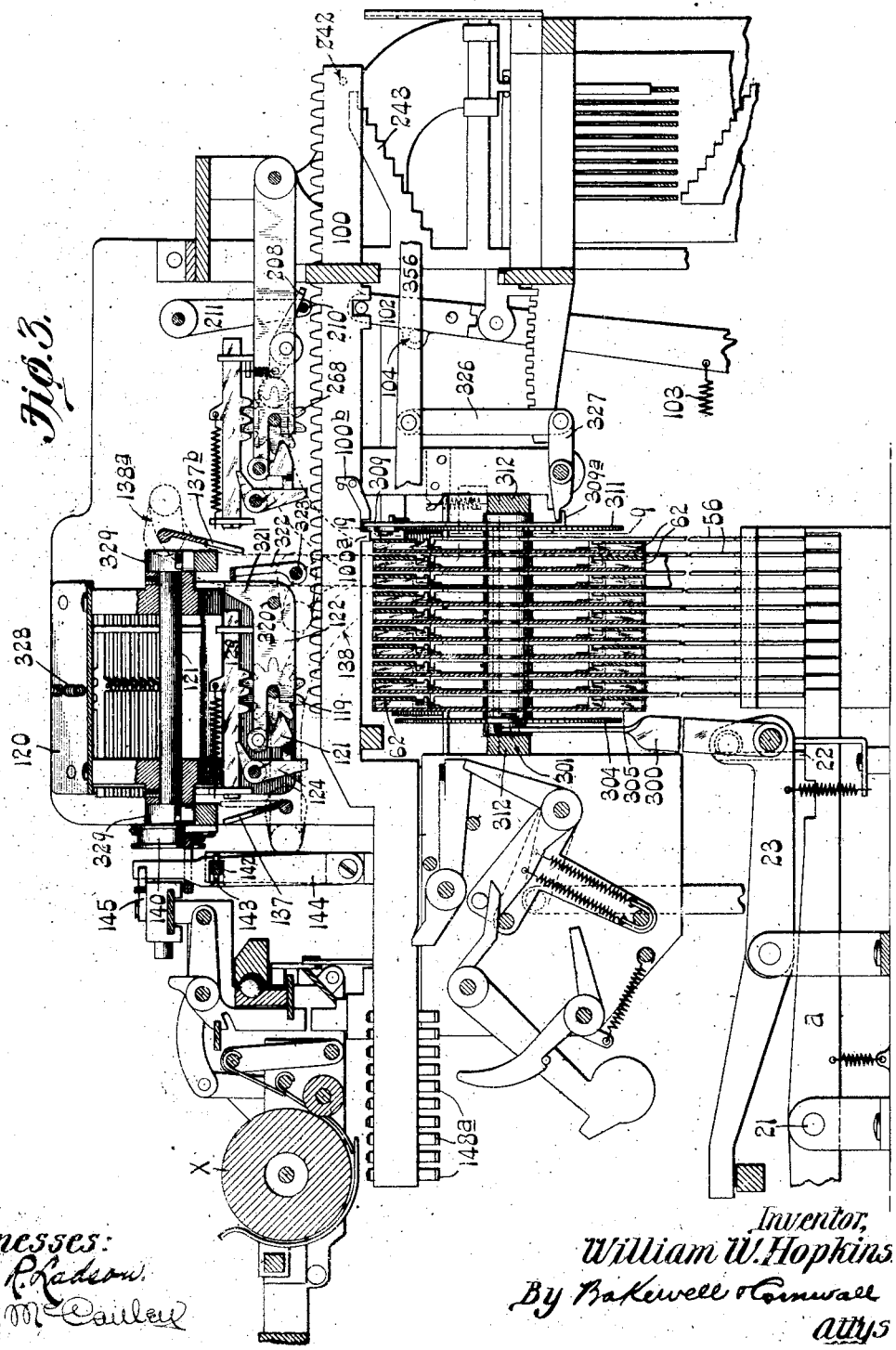
Witnesses:
Geo. P. Ladson.
A. J. McCauley
Inventor,
William W. Hopkins
By Bakewell & Cornwall
Attys

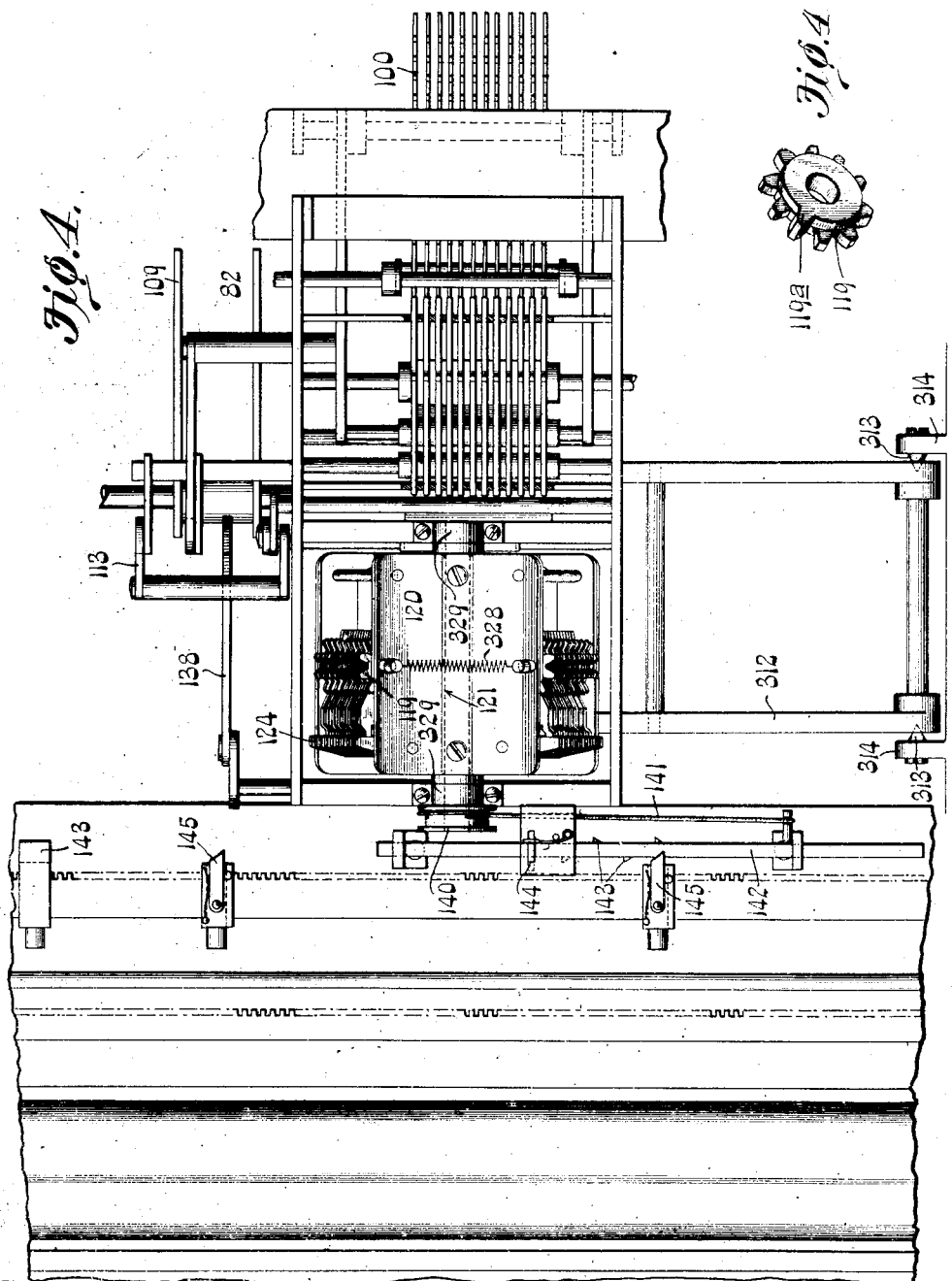

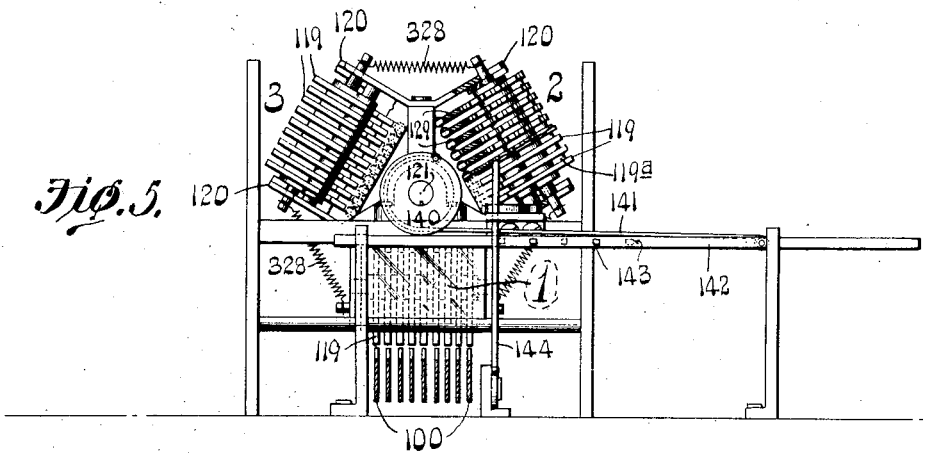
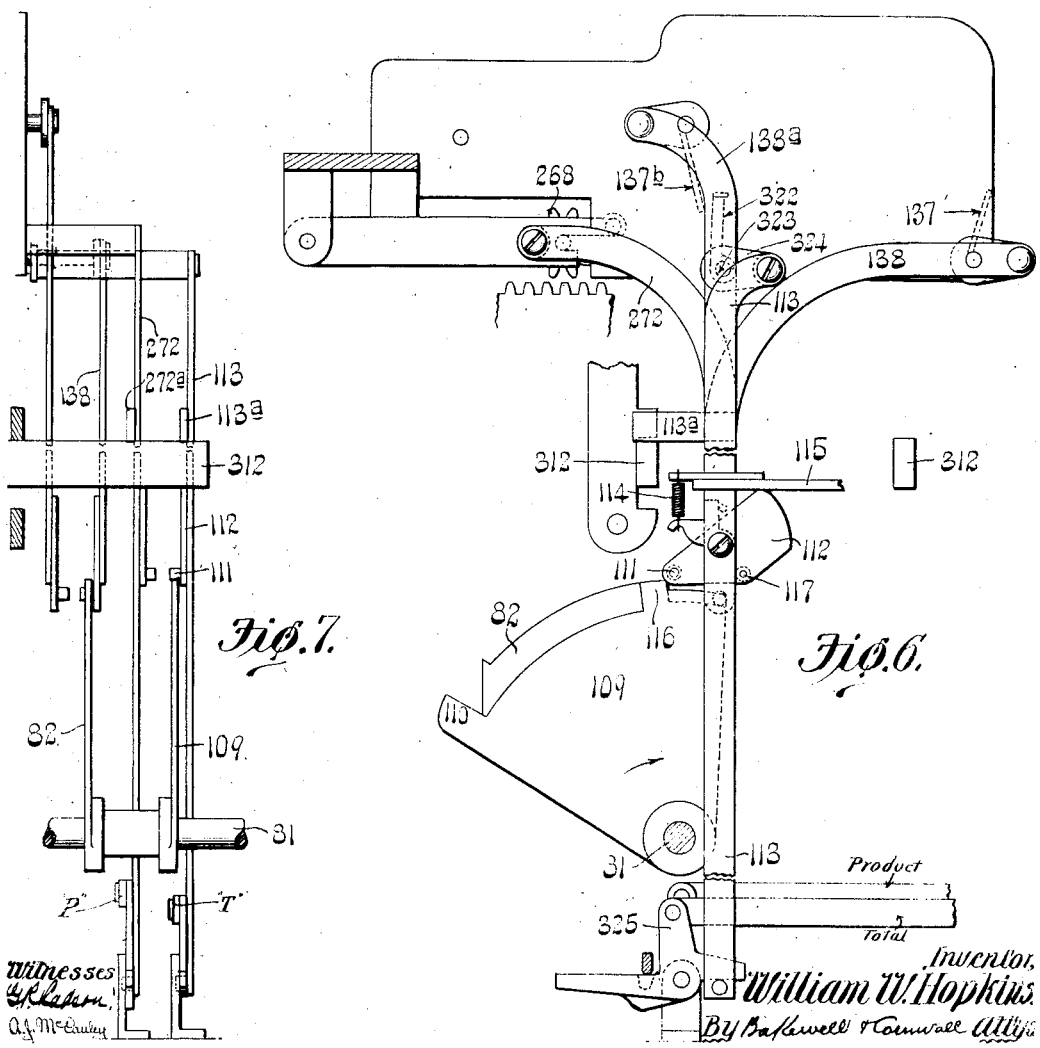

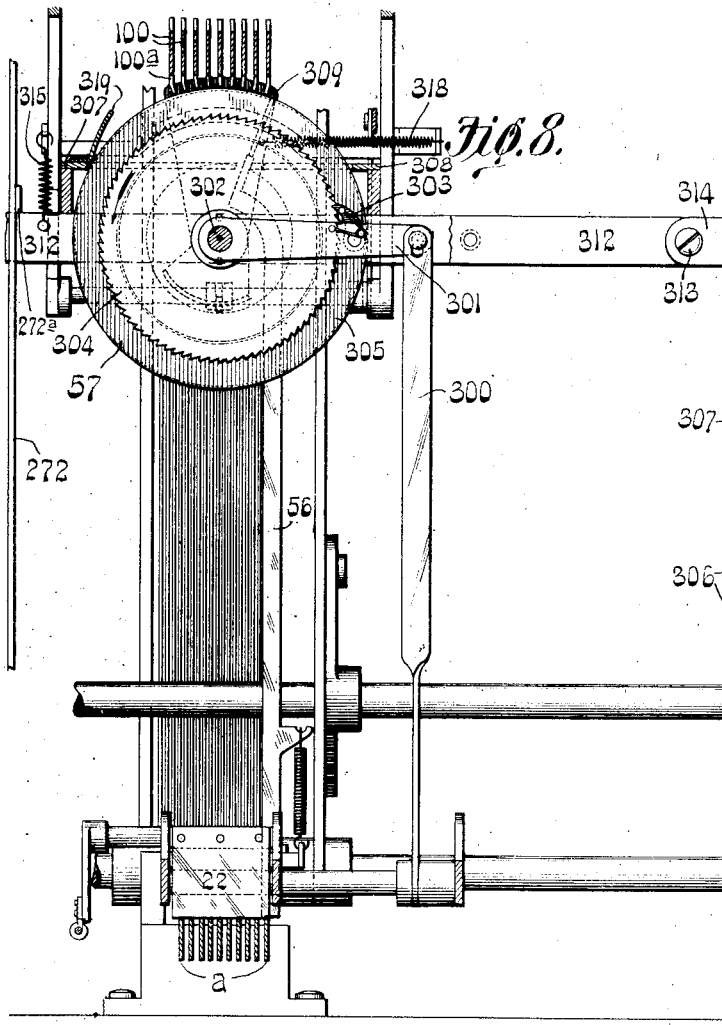
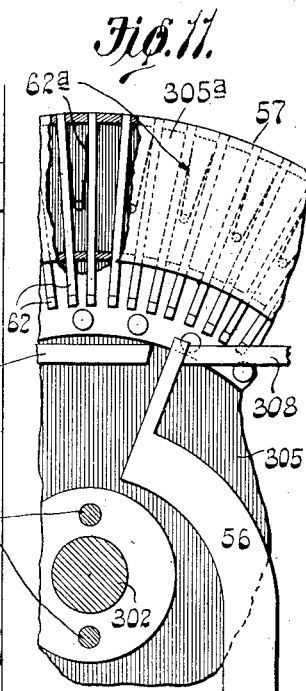
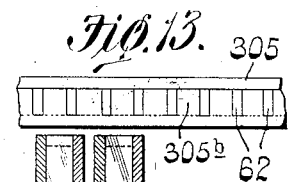
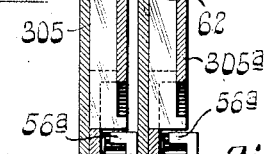
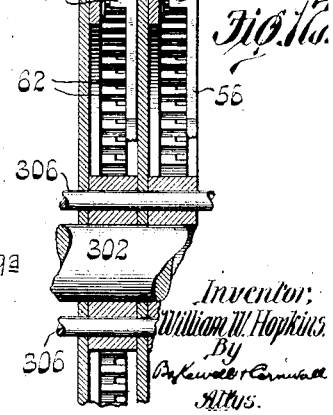
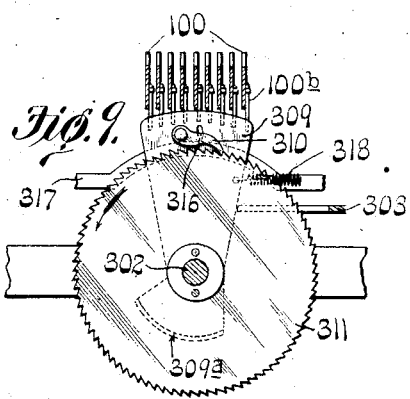
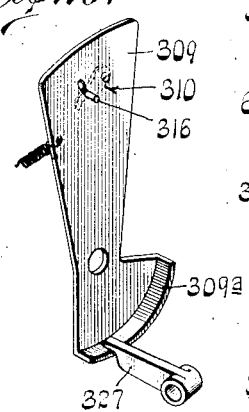

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,085,912.  Specification of Letters Patent.  Patented Feb. 3, 1914.

Application filed October 21, 1908. Serial No. 458,823.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a vertical longitudinal sectional view through the entire machine; Fig. 2 is a horizontal sectional view showing the keys and key connections of the machine; Fig. 3 is an enlarged vertical sectional view through my improved machine; Fig. 4 is a top plan view of a portion thereof; Fig. 4ª is a detail view of one of the totalizer wheels; Fig. 5 is a detail view illustrating the revoluble totalizers; Fig. 6 is a detail view showing the means for actuating the totalizers; Fig. 7 is a rear elevational view of the mechanism shown in Fig. 6; Fig. 8 is a vertical sectional view taken in front of the stop pin carriage; Fig. 9 is a vertical sectional view taken on the line 9—9 of Fig. 3; Fig. 10 is a detail view of a movable stop plate; Fig. 11 is an enlarged detail view of a portion of the stop pin carriage; Fig. 12 is a vertical sectional view illustrating two sections of the stop pin carriage; and Fig. 13 is a top view of one of the sections shown in Fig. 12.

This invention relates to a new and useful improvement in calculating machines of that type illustrated in Belgian Patent No. 202,081, dated August 21, 1907, and United States application No. 310,739, filed by Hubert Hopkins on or about April 9, 1906. All the parts illustrated in the present drawings are similar to those illustrated and described in said patent except the means for setting up the stop pins which control the rack bars, and the arrangement of the forward totalizers. I shall not, therefore, go into an extended explanation of the construction and operation of the entire machine, relying upon said patent and said application for a full description thereof.

The stop carriage is in the form of a rotatable cylindrical magazine containing stop pins which are capable of being moved into operative position by depressing corresponding keys on the key board of the calculating machine. The keys which coöperate with the stop carriage elevate the stop pins and cause them to move into alinement with projections on the rack bars which operate the totalizers. These stop pins travel in circular paths and advance step-by-step as the keys are operated, and after they have served as stops said stop pins are restored to their normal position by passing under a stationary cam plate.

Referring to the accompanying drawings, bars $a$ connected to the keys of group A (see Fig. 2) are mounted on a common pivot 21 and extend rearwardly under a plate 22 (see Fig. 3) mounted in the free end of a frame 23.

300 indicates a link which connects the frame 23 to an arm 301 loosely mounted on a shaft 302 and provided with a pawl 303 which coöperates with a ratchet wheel 304, the latter being rigidly connected to disks 305.

The cylindrical magazine 57 (see Figs. 8 to 13) containing the stop pins is preferably composed of ten wheels or disks 305 each provided with its complement of stop pins 62 which are preferably radially disposed, said pins being also movable radially. Stop pins 62, however, may be tangentially arranged if desired. The stop pins are held in position on their respective disks by means of ring plates 305ª (see Fig. 11), between which and the disk 305 are suitable slotted or perforated plates 305ᵇ (see Fig. 13) forming guides for the stop pins. Stop pins 62 coöperate with springs 62ª which frictionally hold them in their set and retracted positions. The pins 62 on the different disks are arranged in longitudinal alinement so as to form longitudinal series of pins for coöperating with the stop shoulders 100ª on the rack bars, arresting said rack bars in one of ten different positions depending upon the stop pin which is "set".

56 are key-actuated rods or bars (see Figs. 2 and 3) which extend up between the disks where their ends are bent laterally or formed with a lateral projection 56ª so as to lie under the stop pins 62 comprising a longitudinal series. The upper ends of the bars 56 are preferably inclined, as shown in Fig. 11, and guided between the teeth of two comb plates 307 and 308, which teeth extend into the spaces between the stop-carrying disks.

All of the disks 305 are secured together by pins or rods 306, (see Fig. 12) said disks rotating together as a cylinder on the shaft 302. It is obvious from the above description that the stop-pin-carrying cylinder composed of the ten separated disks above described has circumferential grooves or spaces between the disks for the operating bars 56 and their guiding combs.

309 is a plate loosely mounted on shaft 302, which plate is provided with a pawl 310 (see Fig. 9), for coöperating with a ratchet wheel 311 conjoined to the cylindrical stop carrier 57.

100$^b$ indicate pawls carried by the rack bars 100, (see Fig. 3) said pawls coöperating with a plate 309 and constituting releasing mechanism whereby the rack bars, beginning with the rack bar of lowest order, are successively released as the keys are successively operated in setting up an item in the traveling field of stops.

The operation of the above described parts is as follows: When the rear end of one of the bars $a$ is raised, frame 23, which is connected by link 300 to arm 301, is rocked upwardly and the pawl 303 on said arm moves the ratchet wheel 304 and carriage 57 in the direction indicated by the arrow in Fig. 8, thereby bringing the elevated stop pin 62 into alinement with the units rack bar, and at the same time the ratchet 311 which is rigidly secured to the rear end of carriage 57 moves the pawl 310 in the direction indicated by the arrow in Fig. 9, thereby moving the stop plate 309 out of alinement with the pawl 100$^b$ on the units rack bar. It will be readily understood that if another key in group A is depressed, the stop pin just referred to will be moved into alinement with the tens rack bar, plate 309 will move out of alinement with said tens rack bar, and another stop pin will be raised and moved into alinement with the units rack bar. When all the stop pins 62 are raised in introducing an item into the machine, they are located in front of projections 100$^a$ on the rack bars 100, and as the rack bars move forward they are arrested in one of nine different positions by said stop pins 62.

One of the forward totalizers or registers in operative relation to the racks, is now thrown into engagement with the racks when the racks are in their forward position, after which the restoring bar 104 picks up the rocking levers 102, which have slot and pin connections with the racks, (see Fig. 3) and restores the racks to their normal position, and by so doing introduces the item into the register wheels. The rocking levers 102 the same constituting the operating mechanism for the racks are connected to springs 103 which tend to pull them forward.

The means for preventing the overthrow of the stop cylinder consists of the upper end of the key-positioned bar 56. (See Fig. 11.) This being a ten-key machine, but one key at a time is operated, and consequently but one bar 56 is raised. The depression of the key coincident with the elevation of the bar 56 causes the stop cylinder to move forwardly the distance of one step, during which movement bar 56 is raising the stop pin 62. As the bar 56 reaches the limit of its upward movement and the stop pin 62 is positioned or "set," the stop cylinder has been rotated such distance that the lower end of the stop pin immediately behind the upper end of bar 56 engages the rear face of said bar and prevents the cylinder from over-rotating. Should the key be struck forcibly so as to move the stop cylinder with an impulse tending to overthrow it, the upper end of bar 56 will be brought against the comb plate 307. The inclined upper end of bar 56 in engagement with the lower end of stop pin immediately behind it, will, when the bar 56 descends, cause the stop cylinder to rotate reversely a slight distance to its proper position, which proper position is determined by the pawl 303 which, in this operation, acts as a centering pawl. The parts are so proportioned that the overthrow is not equal to or greater than the distance between the teeth on the ratchet 304. Thus, upon the operation of any digit key the stop cylinder will be advanced one step and no more.

The shaft 302, which supports the rotatable stop carriage, is mounted in a frame 312 pivoted at 313 to brackets 314 (see Fig. 8). In introducing an example into the machine, the operating handle 65 (see Fig. 1), which is pulled forward at each operation of the machine, through suitable connections, causes (unless the operator positions means to prevent it) the forward totalizer wheels to be thrown into mesh with the rack bars, so that upon the return movement of the handle the rack bars will introduce the item into the forward totalizer wheels. This movement of the forward totalizers into and out of engagement with the rack bars is utilized to depress and lift the cylinder of stop pins in the following manner: Fixed on the shaft 81, which shaft is operated at each stroke of the handle 65, is a rocking plate 109 provided with a shoulder 110, (see Fig. 6), which, when the plate is nearing the limit of its forward movement, comes in contact with a pin 111 carried by a tappet 112 mounted on a bar 113 normally held in a raised position by a spring 114.

115 is a plate fixed to the framing of the machine and against which the upper cam edge of the tappet 112 rests. When the shoulder 110 strikes the pin 111 the tappet is rocked on its fulcrum on the bar 113 and thereby forces the bar 113 downwardly. When the plate 109 is nearing its home position, a shoulder 116 engages the pin 111 and forces the tappet to assume its normal position. The cam face of the tappet is such that in being restored by the shoulder 116 the action of the spring 114 in lifting the bar will cause the tappet to move until a stop pin 117 carried thereby engages with the front edge of the bar 113, in which (normal) position the tappet pin 111 is lifted above the shoulder 116. The plate 109 is cut away in front of the projection forming the shoulder 116 so as to permit the depression of the bar 113 without interference from the plate 109, as, for instance, in the taking of a total.

After an example has been set up in the machine, the forward movement of the operating handle will cause the rack bars to move forwardly under the impelling action of the springs 103 until arrested by the pins 62. Then the cam plate 109 causes one of the forward totalizers to be engaged with the rack bars and when the handle is moved rearwardly the bar 104 restores the rack bars and actuates the totalizer wheels, introducing the item thereinto.

The bar 113 which moves the front totalizer wheels 119 into and out of engagement with the rack bars is provided with an extension 113$^a$ (see Figs. 6 and 7), which extension coöperates with a swinging frame 312 which carries the stop cylinder, and whenever the bar 113 is depressed the frame 312 and its stop cylinder is likewise depressed, the depression of said stop cylinder causing the stops which have not been restored to be moved out of the paths of the shoulders 100$^a$ on the rack bar.

The pivoted frame 312 which carries the stop cylinder is provided with a spring 315 (see Fig. 8), which lifts said frame and its carried stop cylinder into operative position when permitted to rise by the projection 113$^a$.

The releasing plate 309 which is mounted on the stop cylinder and moved laterally step by step at each operation of the item keys must be released and returned at each operation of the handle, and this is accomplished by providing a pawl 310 with a pin 316, which extends through a slot in the plate 309 (see Fig. 10), and rests upon a relatively stationary curved track bar 317 (see Figs. 8 and 9). Thus, whenever the stop cylinder is depressed it carries with it the plate 309, which not only releases all of the rack bars so far as any restraint by said plate 309 is concerned, but the pawl 310 is raised out of engagement with the ratchet 311, and a spring 318 connected to the plate 309 restores said plate 309 to its normal position, which normal position is determined by the comb plate 309 (see Fig. 9). The relatively fixed bar 317 is the medium which lifts the pawl 310 when the plate 309 is depressed.

As the stop plate 309 is disengaged from the pawls 100$^b$ of the inoperative rack bars when it is moved down, these rack bars are temporarily restrained from moving forward by spring-actuated pawls 208 (see Fig. 3), which pawls are normally held in the position shown by a rod 210 secured to arm 211, but which engage the teeth of the rack bars when the restoring bar 104 is in its forward position. I have not shown in the drawings the connection between the restoring bar 104 and the pawls 208 as the same forms no part of my present invention. It is, however, fully described in the Belgian patent before mentioned. The carriage 57, as it rotates in the direction indicated by the arrow in Fig. 8, eventually brings the elevated stop pins 62 into engagement with a stationary cam plate 319 which restores said pins to their normal position.

In my present construction the cylinder of stop pins is advanced step-by-step as each pin is set up, and contemporaneously with the setting up of a stop pin the rack bars are successively released until the rack bars of the different denominations embraced within the number are free. When the handle is operated the active rack bars may move forward and be arrested by the stop pins in their paths, after which the totalizer is thrown into mesh with the rack bars, and when the rack bars are restored the totalizer wheels are rotated in proportion to the movement of the rack bars. The plate 309 is likewise restored in front of the latch pawls on the rack bars in readiness for the introduction of another example into the machine. The stop pins, however, are not immediately restored as such is not necessary in my improved construction. When the first number of the next example to be introduced into the machine is struck on the keys, the stop pin will be set and advanced in line with the units rack bar. At the same time the units rack bar is released by the plate 309. The stop pin which in the previous example introduced into the machine had been identified with the units rack bar is advanced in front of the tens rack bar, but as the tens rack bar is locked against movement by the plate 309 it is obvious that such stop and all other stops to the left thereof in the cylinder which may stand "set," are ineffective with respect to the rack bars of the machine which are locked against movement. Eventually these stops are restored by means of the cam plate 319 before they again enter the zone of the rack bars.

The register wheels 119 (see Fig. 3) are mounted in frames 122 pivoted at 320 and having extensions 321 which are adapted to be engaged by a rock frame 322, said rock frame being secured to a shaft 323 having an arm 324 (see Fig. 6) which is pivotally connected to the bar 113. The lower end of bar 113 carries a pin which coöperates with a lever 325 connected to the total key bar. When bar 113 is moved down by the total key T, Fig. 2, the register wheels 119 are thrown into engagement with the rack bars, and the extension 113ª on bar 113 depresses the frame 312, thereby moving the stop plate 309 out of alinement with all of the pawls 100ᵇ, so that the register wheels 119 are in engagement with the rack bars and free to move in the total-taking operation.

To obtain the total, the total key (marked T in Fig. 2) is depressed, which moves bar 113 downwardly and causes the register wheels in operative relation to the racks to engage with the racks before the racks start on their forward movement, and consequently the register wheels, if not standing at zero, will be reversely rotated until the printing type carried by the forward end of the rack exhibit the total of the amount registered. A product register represented by the wheels 268 also coöperates with the racks 100, and if desired, instead of introducing an example into one of the groups of register wheels mounted on the reel, the D key may be pressed and the example introduced directly into the wheels 268, as fully set forth in the aforesaid patent.

To obtain the product or total indicated on the register wheels 268, the P key is depressed and the power shaft of the machine operated. In total-taking operations following the depression of the P key, the frame 312 is likewise depressed carrying with it the cylinder of stop pins and plate 309, thus permitting free movement of the racks as in the case of the total-taking operation when the T key is depressed.

The operation of multiplication is performed by setting up the multiplicand through the medium of the keys in group A and pressing the R key, which results in setting up the example in the multiplying devices. The multiplicand, if already set up in one of the forward totalizers, may be transferred through the medium of the racks 100 by pressing the E key and operating said racks. The digits of the multiplier are separately set up by pressing the keys in group B. When a key in group B is depressed the power shaft must be operated twice, except for the zero character, for the purpose of obtaining tens and units partial products which are introduced in the register wheels 268 and there added to form a complete product. When a complete product is obtained the P key may be pressed and the product recorded. Suitable carrying mechanism is provided for the wheels 268. (See Fig. 3.) After keys in group B are depressed and a number set up in the multiplying devices, the stepped extensions 243 are raised by actuating the operating handle, and, by coöperating with pins 242, said extensions 243 serve as stops for the rack bars 100. At the time the stepped extensions 243 are positioned to serve as stops, a bar 356 is raised and the stop pin carriage 57 and its stop plate 309 are lowered. Bar 356 is connected by a link 326 to a lever 327 and as the free end of lever 327 lies above a flange 309ª on the stop plate 309, the carriage 57 will be moved down when bar 356 is raised. The purpose of this is to prevent interference on the part of the plate 309 or any of the unrestored stops in the cylinder 57 from interfering with the rack bars 100 in the multiplying operations.

The means for depressing the stop cylinder when the product register wheels 268 are brought into engagement with the rack bars 100 comprises an extension 272ª on bar 272, which bar 272 is connected to the pivoted frame which carries the wheels 268. Extension 272ª coöperates with the pivoted frame 312 which supports the stop cylinder (see Figs. 4, 6 and 7).

The rack bars carry printing type 148ª by which the items and the total thereof introduced into the adding register or totalizer may be recorded, and when a complete product is obtained said product may be recorded.

The paper on which the printing record is made coöperates with the platen X arranged in the carriage at the top of the machine, (see Figs. 1 and 3) which carriage is movable across the machine. Typewriting mechanism is also used to print words and characters on the paper in the carriage in line with the type impressions derived from the type carried by the rack bars of the calculating machine.

Referring to Fig. 5, it will be seen that the forward totalizers are three in number but it is obvious that this number could be changed. The totalizer wheels 119 are loosely mounted on their respective shafts, which shafts are carried by frames 122 pivotally connected at 320 to side plates 120 and provided with extensions 321 which are adapted to be engaged by a rock frame 322, said rock frame being secured to a shaft 323 having an arm 324 pivotally connected to bar 113. The totalizer shafts extend through slots in the side plates 120 and the wheels 119 are normally held in the elevated position shown in Fig. 3 by means of springs 328 connected to the ends of said shafts. The side plates 120 are rigidly connected to a shaft 121 journaled in stationary bearings 329. It will be seen that the side plates 120 are arranged to form three separate compartments, and that each compartment contains a set of totalizer wheels and carrying mechanism therefor.

The carrying mechanism for the register wheels 119 is similar in operation to the carrying mechanism shown in the patent and application referred to, with the following difference: In lieu of a single set of carrying devices common to all the totalizers, there is a set of carrying devices for each totalizer. One of these will now be described. The carrying teeth which engage the register wheels are arranged on a horizontally movable bar 129 which is restrained from movement by a pawl 124. This pawl is controlled by a pendant 121 operated by tripping projections 119$^a$ (shown in Fig. 4$^a$) on the register wheels 119. Whenever one of the pendants 121 is operated to release the pawl 124, the bar 129 jumps forwardly to a position where the pawls 124 will not enter their notches. At this time the register wheels 119 are in mesh with the racks 100, and, of course, out of mesh with the teeth on the bars 129. When the register wheels 119 are disengaged from the racks 100 and thrown into mesh with the teeth on bars 129, a restoring plate 137 which occupied the position shown in dot and dash lines in Fig. 3, and held the bars 129 against movement, is vibrated to release the bars 129 and effect the carrying.

The plate 137 is operated by a link 138 having a tappet which coöperates with the cam plate 82 (see Fig. 6). The operation of this cam plate 82 is such that when the handle moves forward the tappet is idly vibrated, leaving the restoring plate away from the bars 129. As the handle moves rearwardly the tappet and bar 138 are lifted so as to move the restoring bar inwardly, restoring all of the bars 129, the heel of the cam face at the rear end of plate 82 insuring the proper seating of the pawls 124 by imparting to the bars a slight excess movement. The restoring plate then drops away from the bars 129 a slight distance, so that if any of the pawls 124 are tripped when the adding wheels are being rotated they will release the bars 129, but said bars will be restrained from movement until the tappet drops into the recess at the forward edge of the cam plate. At this time the handle has disengaged the adding wheels from the racks, said adding wheels in such movement becoming engaged with the bars 129. After such engagement the restoring plate is moved away from the bars 129 and carrying is effected. Thus, at the end of each operation the adding wheels stand fully carried when the handle is in its home position, but the bars 129 are not restored until the handle starts on its rearward movement upon the succeeding operation thereof.

The carrying mechanism of the rear totalizer coöperates with a restoring plate 137$^b$ which is actuated by a bar 138$^a$, and the wheels of this totalizer are moved into and out of mesh with the rack bars by means of a bar 272.

To revolve the totalizers and bring them successively into mesh with their actuating racks, I arrange a spring drum 140 on the end of shaft 121, which spring drum tends at all times to rotate the shaft 121 in one direction. To rotate shaft 121 in the opposite direction I arrange a cable 141 on said spring drum, said cable being connected to a bar 142 having escapement teeth 143 (see Figs. 3, 4 and 5). 144 is a pivoted rocking plate which coöperates with the escapement teeth 143, and this plate 144 is vibrated by tappets 145 mounted on the frame of the laterally movable paper carriage. These tappets are preferably mounted on adjustable blocks so that they may coöperate with the plate 144 in different positions of the paper carriage. If it is desired to print separate columns on a sheet of paper and separately add the items of the different columns, it is obvious that when the laterally movable paper carriage is positioned for the respective columns the plate 144 will be vibrated, which vibration permits the spring in drum 140 to revolve the totalizers and present the appropriate totalizer in operative relation to the actuating racks for each separate column. The left-hand end of escapement bar 142 coöperates with the fixed stop 143 on the paper carriage, whereby whenever the paper carriage is moved from left to right the totalizers are revolved to their normal or starting positions. In Fig. 5 the totalizers have been marked 1, 2 and 3, and if we assume that the machine is normal when totalizer 1 is in operative relation to the racks it is obvious that after the paper carriage is moved toward the left, so that numbers may be printed in the second column, the first tappet 145 will operate the escapement mechanism and bring totalizer number 2 in operative relation to the racks. The steps in the partial revolutions of the totalizers continue until totalizer number 3 is brought in position to register the number recorded in the third column. When the carriage is restored to its normal position at the right the totalizers will be revolved so as to bring totalizer number 1 in operative position to the actuating racks.

In the event that an error occurs in the introduction of an example in the machine, an error key 206 (see Fig. 2) may be operated to re-set the multiplying devices, as in the patent and application before mentioned, and if desired a connection can be made between said error key and the pivoted frame 312, whereby when said error key is operated said frame will be depressed so as to lift the pawl 310 and release the plate 309, permitting said plate to be restored to its position in front of the pawls 100ᵇ of all of the rack bars. The T and P keys can be used as error keys to prevent an example erroneously set up on the stop pins through the keys in group A to be introduced into the totalizers, as the operation of both of these keys likewise results in depressing the cylinder of stops and restoring the plate 309 to its normal position. Releasing the T and P keys will elevate the stop cylinder to normal position.

While I have illustrated in this application means for depressing the stop cylinder for the purpose of preventing interference with the movement of the rack bars by the stop pins and plate 309, it is obvious that other means could be provided for permitting the racks to move without interruption from the stop pins or the plate 309. For instance, instead of depressing the stop cylinder and plate 309 means could be provided for advancing the stop cylinder the distance of one-half a step so that the stop pins would be located between the bars and thus permit free movement of the bars. The means which advanced the cylinder one-half a step could depress the plate 309 independently of the stop cylinder. Or, means could be provided for rotating the stop cylinder a distance equal to nine steps so that all the positioned stop pins could be moved out of the path of the racks. When imparting such a movement to the stop cylinder the plate 309 could also be moved out of the path of the racks, and in this manner release the racks.

Having thus described the invention, what is claimed as new and desired to be secured by Letters Patent is:

1. In a calculating machine, the combination with a totalizer and its actuating devices, of controlling means for said actuating devices comprising a cylinder consisting of a plurality of disks, a series of stop-pins arranged around the periphery of each disk, means for positioning certain of said stop-pins as they are brought in control of the actuating devices, and means for revolving said disks.

2. In a calculating machine, the combination with a totalizer and its actuating devices, controlling means for the actuating devices comprising a plurality of disks moving in unison, stop-pins arranged entirely around said disks, means for holding said stop-pins in their projected and retracted position, means for projecting said stop-pins as they are brought in control of said actuating devices, and means for revolving said disks.

3. In a calculating machine, the combination with a totalizer and its actuating devices, of controlling means for the actuating devices comprising a plurality of disks, stop pins carried by the disks, and means interposed between the disks for operating said stop pins; substantially as described.

4. In a calculating machine, the combination with a totalizer and its actuating devices, of controlling means for the actuating devices comprising a plurality of disks, stop pins carried by said disks, key-operated bars interposed between the disks for positioning said stop pins, and means for guiding said bars in their movement; substantially as described.

5. In a calculating machine, the combination of a totalizer and its actuating devices, controlling means for said actuating devices comprising a plurality of disks, stop-pins carried by said disks, key-operated bars for positioning said stop-pins as they are brought in control of said actuating devices, and means for advancing said disks step-by-step as the stops are successively positioned.

6. In a calculating machine, a totalizer and its actuating racks provided with projections, in combination with stop pins, means for advancing said stop pins step-by-step in the path of said projections, and means for restoring said stop pins after they have passed beyond the zone of the projections on the racks; substantially as described.

7. In a calculating machine, a totalizer and its actuating racks provided with projections, in combination with stop pins, means for advancing said stop pins step-by-step in the path of said projections, and means for moving said stop pins out of coöperative relation to the projections on said rack bars before said stop pins are restored, whereby the racks may move freely and without interruption from said stop pins; substantially as described.

8. In a calculating machine, a totalizer and its actuating racks provided with projections, in combination with stop pins, means for advancing said stop pins step-by-step in the path of said projections, means for successively releasing the racks as the stop pins are successively positioned, and means for restoring the releasing device to normal position, in the event of an error, independently of said stop pins; substantially as described.

9. In a calculating machine, a totalizer and its actuating racks, means for successively releasing said actuating racks, and means for effecting a separation between said racks and its releasing means, to restore the releasing means to normal position, substantially as described.

10. In a calculating machine, a totalizer and its actuating racks, stop shoulders and pivoted pawls on said racks, stop pins for coöperating with said shoulders, a releasing device for coöperating with said pawls, and means for depressing said stop pins and releasing device out of operative relation to said racks; substantially as described.

11. In a calculating machine, the combination of actuating devices, a totalizer carrier, and totalizers pivotally mounted in said carrier and rotating about axes angularly disposed with relation to each other.

12. In a calculating machine, the combination with actuating devices, a totalizer carrier, a plurality of frames pivotally mounted in said carrier and separate groups of totalizer wheels in said pivoted frames which rotate about the axes angularly disposed with relation to each other.

13. In a calculating machine, the combination of actuating devices, a totalizer carrier, a series of independent movable frames pivotally mounted in said carrier, and totalizer wheels in each of said frames, said totalizer wheels rotating about axes angularly disposed with relation to each other, and means for positioning said carrier.

14. In a calculating machine, the combination of actuating devices, a revoluble totalizer carrier, separate groups of totalizer wheels mounted in said carrier and rotating about axes angularly disposed with relation to each other, and separate sets of carrying devices for said groups of totalizer wheels.

15. In a calculating machine, the combination of actuating devices, a revoluble carrier, frames pivotally mounted in said carrier, groups of totalizer wheels in said frames, a set of carrying devices for each set of totalizer wheels, and means for swinging said frames and their carried totalizer wheels into operative relation to said actuating devices; substantially as described.

16. In a calculating machine, actuating devices, revoluble totalizers each having a set of register wheels, means for revolving said totalizers, and means for shifting one of the sets of register wheels away from the axis around which the totalizers revolve; substantially as described.

17. In a calculating machine, actuating devices, revoluble totalizers, means for revolving said totalizers, and means for shifting said totalizers away from their axes of revolution; substantially as described.

18. In a calculating machine, actuating devices, revoluble totalizers, means for revolving said totalizers, and means for shifting said totalizers away from their axes of revolution so as to engage them with said actuating devices; substantially as described.

19. In a calculating machine, actuating devices, revoluble totalizers rotating about axes angularly disposed with relation to each other, carrying mechanism for said totalizers, and means for revolving said totalizers and their carrying mechanism.

20. In a calculating machine, actuating devices, revoluble totalizers rotating about axes angularly disposed with relation to each other, separate carrying mechanisms for each of said totalizers and means for revolving said totalizers.

21. In a calculating machine, actuating devices, a revoluble carriage, totalizers and their carrying mechanism mounted in said carriage, said totalizers rotating about angularly disposed axes and means for revolving said carriage; substantially as described.

22. In a calculating machine, actuating devices, a revoluble carriage divided into compartments, a totalizer and carrying mechanism therefor mounted in each of said compartments, said totalizers rotating about axes angularly disposed with relation to each other.

23. In a calculating machine, actuating devices, a revoluble carriage divided into compartments, a totalizer and a supporting member for each of said totalizers, and means for actuating said supporting members independently; substantially as described.

24. In a calculating machine, a key board, a totalizer, actuating devices therefor, a rotatable carriage, stops mounted on said carriage, keys on said key board for moving said stops, means for causing said stops to coöperate with said actuating devices, and means for shifting said carriage away from said actuating devices; substantially as described.

25. In a calculating machine, a totalizer, actuating devices therefor, a carriage, means for moving said carriage step-by-step, stops arranged in rows on said carriage, key-controlled devices for projecting said stops into alinement with said actuating devices, a stop which normally prevents said actuating devices from operating the totalizer, and means for causing the last mentioned stop to move in unison with said carriage; substantially as described.

26. In a calculating machine, a totalizer, actuating devices therefor, a carriage, means for moving said carriage step-by-step, stops arranged in rows on said carriage, key-controlled devices for projecting said stops into alinement with said actuating devices, an oscillating stop which normally prevents said actuating devices from operating the totalizer, and means for causing the last mentioned stop to move in unison with said carriage; substantially as described.

27. In a calculating machine, a totalized, actuating devices therefor, a rotatable carriage, means for moving said carriage step-by-step, stops arranged in rows on said carriage, key-controlled devices for projecting said stops into alinement with said actuating devices, a stop which normally prevents said actuating devices from operating the totalizer, and means for causing the last mentioned stop to move in unison with said carriage; substantially as described.

28. In a calculating machine, two totalizers, actuating devices therefor, stops for limiting the movement of said actuating devices, the stops which coöperate with one of said totalizers being mounted in a rotatable carriage, a pivoted support for said carriage, and means for swinging said carriage away from said actuating devices; substantially as described.

29. In a calculating machine, a totalizer, actuating devices therefor, a movable carriage, stop pins in said carriage, and means for positioning said stop pins, said positioning means also preventing an overthrow movement of the carriage; substantially as described.

30. In a calculating machine, the combination of a totalizer, actuating devices therefor, a movable carriage, stop pins in said carriage, key-positioned push bars for setting said stop pins, said push bars comprising means for preventing overthrow movement of the carriage; substantially as described.

31. In a calculating machine, the combination of a totalizer, actuating devices therefor, a carriage, stop pins in said carriage, means for positioning said stop pins, said means also preventing overthrow movement of the carriage, and a spring-pressed centering pawl for determining the position of the carriage; substantially as described.

32. In a calculating machine, the combination of a movable carriage, stop pins in said carriage, and means for positioning said stop pins during the time that said carriage is moving; substantially as described.

33. In a calculating machine, the combination of a movable carriage, stop pins in said carriage, and means for positioning said stop pins, said means being movable with the carriage; substantially as described.

34. In a calculating machine, the combination of a carriage, stop pins in said carriage, means for positioning said stop pins, said means being movable with the carriage, and coöperating with fixed devices for preventing overthrow movement of the carriage; substantially as described.

In testimony whereof I hereunto affix my signature in the presence of two witnesses, this sixteenth day of October 1908.

WILLIAM W. HOPKINS.

Witnesses:
F. R. CORNWALL,
GEORGE BAKEWELL.